United States Patent [19]
Ruttenberg

[11] 3,903,068
[45] Sept. 2, 1975

[54] FACILE SYNTHESIS OF HUMAN INSULIN BY MODIFICATION OF PORCINE INSULIN

[75] Inventor: Michael A. Ruttenberg, Newton Highlands, Mass.

[73] Assignee: The United States of America as represented by the Secretary of Health, Education, and Welfare, Washington, D.C.

[22] Filed: Dec. 26, 1972

[21] Appl. No.: 318,247

[52] U.S. Cl. ................................ 260/112.7; 424/9
[51] Int. Cl.² .................. C07C 103/52; C07G 7/00
[58] Field of Search ................................ 260/112.7

[56] References Cited
UNITED STATES PATENTS
3,276,961  10/1966  Bodanszky et al. .............. 260/112.7

OTHER PUBLICATIONS
Prout, Metabolism, 12. 673–675, (1963).
Bromer et al., Biochem. Biophys. Acta, 133, 219–223, (1967).
Levy et al., Biochem., 6, 3559–3568, (1967).

*Primary Examiner*—Elbert L. Roberts
*Assistant Examiner*—Reginald J. Suyat

[57] ABSTRACT

A method of converting natural porcine insulin to human insulin by reversibly blocking the six carboxyl groups in porcine insulin, digesting the blocked porcine insulin with trypsin to remove the carboxyl terminal octapeptide from the porcine insulin B chain and generating a free carboxyl group in the arginine residue in position 22 of the B chain, and then reversibly blocking all amino groups preferably with BOC azide and coupling the free carboxyl at position 22 to a synthetic octapeptide which corresponds to the sequence at the carboxyl end of the B chain in human insulin, and finally removing all protecting groups from carboxyl and amino and purifying and recovering synthetic human insulin. This method is also susceptible to preparing radioactively labelled human insulin by utilizing radioactive amino acids in the synthesis of the octapeptide grafted or placed on the porcine residue. Further the present method also permits the facile synthesis of insulin analogs, since any selected amino acid sequence may be attached to the carboxyl group at position 22. The above method, in summary, by means of chemical and enzymatic treatment, makes possible the removal quantitatively and selectively of the carboxyl terminal octapeptide from the porcine insulin B chain. This fragment may be replaced by an analogous synthetic human octapeptide to give a protein which is identical to human insulin by a satisfying number of criteria.

5 Claims, No Drawings

FACILE SYNTHESIS OF HUMAN INSULIN BY MODIFICATION OF PORCINE INSULIN

Insulin is a protein composed of two polypeptide chains linked together by two disulfide bridges. The A chain is composed of 21 amino acid residues, while the B chain contains 30 as shown in Table I below.

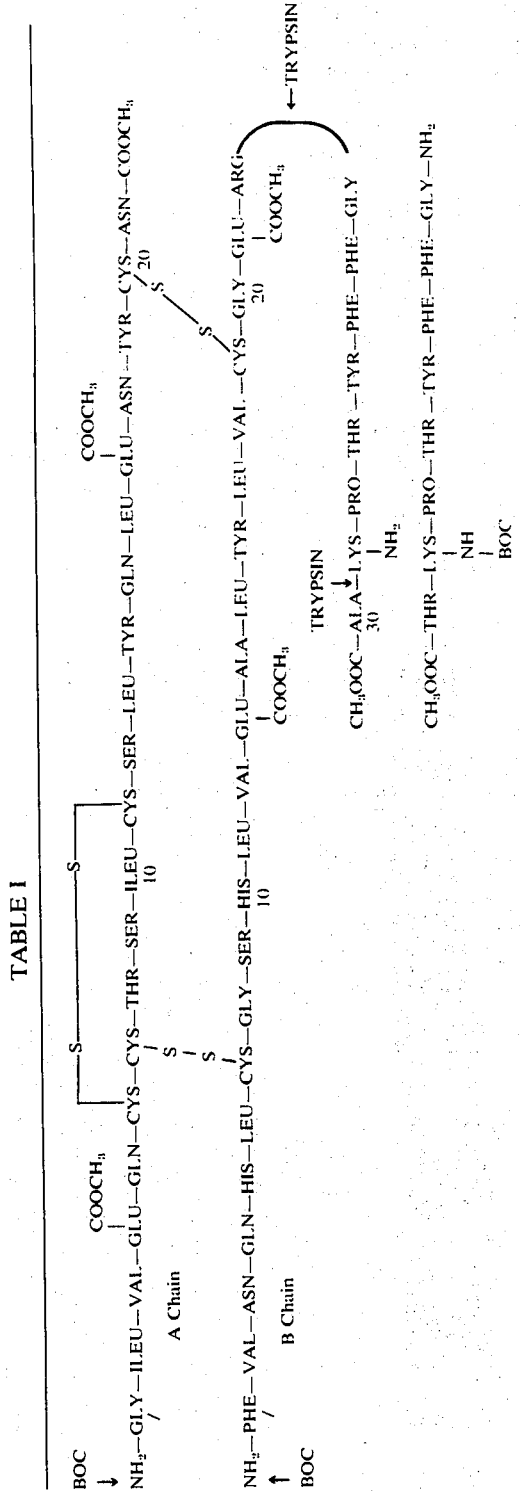

The complete de novo synthesis of insulin has been successfully accomplished in a number of laboratories as reported, for example, in Y.-T. Kung, et al, Sci. Sinica (Peking) 14, 1710 (1965). While these chemical syntheses represent major breakthroughs in synthetic protein chemistry, they are in no way practical for large scale and inexpensive production of insulin. The de novo synthesis of a protein containing 51 amino acid residues is time consuming and expensive. In addition, the yields of insulin are rather low at the stage where the A and B chains are linked together by disulfide bridges. In this regard, the present invention has a special advantage in that at no stage of the process are the disulfide bridges between the A and B chain disrupted.

Up to this time, the only practical supply of insulin for treatment of diabetes mellitus has been from animal sources. The utilization of animal sources, usually beef and pork, has presented a problem of immunologic intolerance among treated patients to these non-human proteins [C. C. Pope, Adv. Immunol. 5, 209 (1966)]. This intolerance may be a primary cause of the pathological changes that occur among diabetic patients maintained on insulin therapy for extended periods of time. Therefore, it is the purpose of the present invention to develop insulin identical in structure to the human protein which could then for the first time be made available for such patients. The estimated cost of the present synthesized human protein versus the now utilized porcine insulin is about 2:1, but for sustained therapy the cost differential is believed to be outweighed by the therapeutic results.

The present process in outline form is set out below and also refer to Table I.

Step 1. Reversible blocking of all of the six carboxyl groups in porcine insulin. These comprise the four γ-carboxyl groups from glutamic acid residues and the two terminal carboxyl groups. The carboxyl groups are preferably blocked by converting to the methyl esters and the term reversible is utilized since they are unblocked in the last stage of the process.

Step 2. Digestion of blocked porcine insulin with trypsin. Referring to Table I, it is noted that the alkaline proteinase trypsin severs the B chain at 22, the arginine position, and also acts to sever that portion of the chain between (29) lysine and (30) alanine. The activity of trypsin also generates a single free carboxyl group at the arginine residue at position 22 of the B chain.

Step 3. Reversible blocking of all free amino groups preferably with t-butyloxycarbonyl azide (BOC azide) in the manner of Levy and Carpenter, Biochem 6, 3559 (1967).

Step 4. Coupling of the free carboxyl at position 22 to a synthetic octapeptide which corresponds to the sequence at the carboxyl end of the B chain in human insulin.

Step 5. Removal of all protecting groups of Steps 1 and 3 and purification of the human insulin.

In the procedure above, it is noted that the most preferred blocking group for the carboxyl as in Step 1 was by formation of the methyl ester from diazomethane and that the most preferred group for blocking of the amino groups was the BOC azide group of Step 3. In both cases, selection of the blocking agent was made in order to be able to nullify or reverse the protection or blocking in the last stage, which stage comprises freeing the active groups and purifying the synthetic human insulin.

EXAMPLE I

Porcine insulin was obtained from Elanco Products and was purified by chromatography on a column of carboxymethylcellulose with a linear gradient of volatile pyridine acetate buffer. In a typical experiment, "C," 2.7 g. of human insulin were recovered from a starting material of 4.0 g. of purified porcine insulin. The pork insulin was treated with diazomethane at a pH of 4.6 in a pH stat as described by Chibnall, Mangen, and Rees, Biochem. J. 68, 114 (1958). It was found that the six carboxyl groups were quantitatively converted to the methyl esters with no apparent side reactions. The extent of esterification was determined by microanalysis for methoxyl content.

The porcine insulin methyl ester prepared above was then digested with chymo-trypsin-free trypsin at a pH of 7.5 for 20 hours according to the procedure essentially as described in Young and Carpenter, J. Biol. Chem. 236, 743 (1961). The digestion by trypsin was quantitative, and when monitored in the pH stat, was found to reach completion in 45 minutes. As compared with the prior art, the digestion in trypsin was rapid [Young and Carpenter, J. Biol. Chem. 236, 743 (1961) and Carpenter and Baum, J. Biol. Chem. 237, 409 (1962)]. This rapid digestion it is believed may be a consequence of the absence of a negatively charged group normally present at the glutamic acid adjacent to arginine in the B chain, together with the absence of the negative charge at the carboxyl terminal alanine adjacent to lysine, as a result of the esterification.

The entire material from the tryptic digestion was applied to a 4 × 100 cm column of Sephadex G-75 and eluted with 0.2 M acetic acid. The desired product of desoctapeptide insulin pentamethyl ester emerged as a single peak. Amino acid analysis of this product material is given in Table II.

A second peak contained the heptapeptide gly-phe-phe-tyr-thr-pro-lys, as well as the alanine methyl ester. These products were separated on Sephadex G-10 in 0.2 M acetic acid and their composition was confirmed by amino acid analysis. The product material in peak 1 was isolated by lyophilization and then treated with BOC azide as described by Levy and Carpenter, ante. The BOC azide reacted quantitatively with the two free amino groups in the molecule. It is noted that from the viewpoint of peptide coupling reactions, the only functional group on the molecule at this point is the terminal carboxyl group at arginine on the B chain, position 22, and therefore this material was suitable for coupling to the amino terminal group on a synthetic human octapeptide.

EXAMPLE II

Human octapeptide was prepared by a straightforward condensation of amines. Threonine methyl ester was prepared as described by Poduska and Rudinger, Collection Czechoslov. Chem. Commun. 24, 3449 (1959), and was coupled to $\epsilon$-BOC-$\alpha$-CBZ-lysine N-hydroxysuccinimide ester, prepared as described by Ruttenberg, J. Am. Chem. Soc. 90, 5598 (1968). Subsequently, the CBZ group was removed by catalytic hydrogenation in methanol using palladium catalyst on charcoal. The resultant dipeptide was coupled to CBZ-proline N-hydroxysuccinimide ester. Again the CBZ group was removed by catalytic hydrogenation, giving the tripeptide pro-$\epsilon$-BOC-lys-thr methyl ester, which crystallized from methanol. A pentapeptide CBZ-gly-phe-phe-OBz-tyr-OBz-thr was prepared by means of a solid phase method [Merrifield, J. Am. Chem. Soc. 85, 2149 (1963)]. The appropriate BOC amino acids (Sigma Biochemicals) were employed and the pentapeptide hydrazide was obtained by treatment of the pentapeptidyl resin with hydrazine as described by Ohno and Anfinsen, J. Am. Chem. Soc. 89, 5994 (1967).

The pentapeptide hydrazide above was treated with nitrous acid to form the azide, which was then combined with the free tripeptide pro-$\epsilon$-BOC-lys-thr methyl ester. Hydrogenation of the octapeptide with palladium catalyst on charcoal gave $NH_2$-gly-phe-phe-tyr-thr-pro-

TABLE II.

Amino acid composition of peptides used. Quantitative amino acid analysis was performed on acid hydrolysates using a Beckman-Spinco model 120B amino acid analyzer according to the procedure of Spackman, Stein, and Moore, Anal. Chem. 30, 1190 (1958). Values found are given as ratios with respect to lysine or arginine.

| Amino Acid | Chromatographically Pure Porcine Insulin | | Desoctapeptide Porcine Insulin | | Synthetic Human Octapeptide | | Chromatographically Pure Partially Synthetic Human Insulin | |
|---|---|---|---|---|---|---|---|---|
| | Expected | Found | Expected | Found | Expected | Found | Expected | Found |
| Lysine | 1 | 1.0 | 0 | 0.1 | 1 | 1.0 | 1 | 1.0 |
| Histidine | 2 | 1.8 | 2 | 1.9 | | | 2 | 1.8 |
| Arginine | 1 | 1.0 | 1 | 1.0 | | | 1 | 1.0 |
| Aspartic acid | 3 | 2.8 | 3 | 2.8 | | | 3 | 2.7 |
| Threonine | 2 | 1.9 | 1 | 0.9 | 2 | 1.9 | 3 | 2.7 |
| Serine | 3 | 2.7 | 3 | 2.8 | | | 3 | 2.8 |
| Glutamic acid | 7 | 6.7 | 7 | 7.1 | | | 7 | 6.8 |
| Proline | 1 | 1.0 | 0 | 0.0 | 1 | 1.0 | 1 | 1.0 |
| Glycine | 4 | 4.1 | 3 | 3.2 | 1 | 1.0 | 4 | 4.2 |
| Alanine | 2 | 2.1 | 1 | 1.1 | | | 1 | 1.1 |
| Half cystine | 6 | a | 6 | a | | | 6 | a |
| Valine | 4 | 3.6 | 4 | 3.6 | | | 4 | 3.6 |
| Isoleucine | 2 | 1.7 | 2 | 1.7 | | | 2 | 1.8 |
| Leucine | 6 | 5.7 | 6 | 5.7 | | | 6 | 5.7 |
| Tyrosine | 4 | 3.9 | 3 | 3.1 | 1 | 0.9 | 4 | 3.8 |
| Phenylalanine | 3 | 3.1 | 1 | 0.9 | 2 | 2.1 | 3 | 3.1 |

"Not determined.

ε-BOC-lys-thr methyl ester, the carboxyl terminal sequence of human insulin B chain.

EXAMPLE III

The synthetic octapeptide of Example II above was then coupled to the di-BOC-desoctapeptide insulin pentamethyl ester prepared above in Example I using dicyclohexyl carbodiimide in tetrahydrofuran at 0°, with the addition of 1 equivalent of N-hydroxysuccinimide. According to the observations of Zimmerman and Anderson, J. Am. Chem. Soc. 89, 7151 (1967), this method produces peptide coupling with virtually no racemization, and this was found to be the case.

The purified product was subjected to tryptic digestion, after removal of the BOC groups, and quantitative cleavage formed at the newly formed arginyl-glycine bond.

The synthetic human insulin product was proved by chromatography on Sephadex G-75, following removal of the BOC groups. The methyl esters were saponified as described by Chibnall, Mangen, and Rees, Biochem. J. 68, 114 (1958). The chromatograph analysis showed the product to be essentially homogeneous, and the material was found to have the correct amino acid composition for human insulin (cf. Table II). Additionally, assay for biological activity utilizing the mouse convulsion technique as described by Katsoyannis and Tometsko. Proc. Natl. Acad. Sci. U.S. 55, 1554 (1966), showed that the in vivo activity utilizing a blind assay was equivalent to that of porcine insulin. As addditional proof, the digestion of the product with trypsin quantitatively removed the synthetic octapeptide and thus confirmed its attachment at position 22 of the B chain.

EXAMPLE IV

In the same manner as Example II, human octapeptide was prepared by straightforward condensation of amines. In this example, however, the starting material, threonine methyl ester, was internally labelled successively with $C^{14}$ and $H^3$ by an injection of the amino acid according to the technique set out in Williams and Chase, Methods in Immunology and Immunochemistry, Volume 1, Academic Press, 1967, pages 387–389.

For ease of counting and efficiency of operation, the $C^{14}$ amino acid internal labelling was preferred, and it is noted that loss of amino acid through metabolism and excretion was minimal. The activity of the finished protein similar to the product obtained in Example III was tested by the thin window technique in a Geiger-Mueller counter.

The embodiments of this invention in which an exclusive property or privilege is claimed are defined as follows:

1. A method of converting natural porcine insulin to human insulin by
   a. reversibly blocking the six carboxyl groups in porcine insulin by conversion to the methyl esters;
   b. digesting the blocked porcine insulin with trypsin to remove the carboxyl terminal octapeptide from the porcine insulin B chain and generating a free carboxyl group in the arginine residue in position 22 of the B chain;
   c. reversibly blocking all amino groups with BOC azide;
   d. coupling the free carboxyl at position 22 to a synthetic octapeptide which corresponds to the sequence at the carboxyl end of the B chain in human insulin;
   e. removing all protecting groups from carboxyl and amino and purifying and recovering synthetic human insulin.

2. The method according to claim 1 wherein the amino groups are blocked with a BOC azide.

3. The method according to claim 1 wherein the six carboxyl groups of porcine insulin are reversibly blocked by the formation of methyl esters from diazomethane.

4. The method according to claim 1 wherein the synthetic octapeptide utilized for coupling agent is radioactively labelled.

5. The method according to claim 4 wherein the synthetic octapeptide utilized is radioactively internally labelled.

* * * * *